United States Patent
Lopez et al.

(10) Patent No.: US 10,101,714 B2
(45) Date of Patent: *Oct. 16, 2018

(54) WELL FLUID EXCHANGE FLOW CONTROL

(71) Applicant: Halliburton Energy Services, Inc., Houston, TX (US)

(72) Inventors: Jean-Marc Lopez, Plano, TX (US); Michael Linley Fripp, Carrollton, TX (US); Stephen Michael Greci, Little Elm, TX (US); Liang Zhao, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 455 days.

This patent is subject to a terminal disclaimer.

(21) Appl. No.: 14/436,838

(22) PCT Filed: Apr. 17, 2013

(86) PCT No.: PCT/US2013/036991
§ 371 (c)(1),
(2) Date: Apr. 17, 2015

(87) PCT Pub. No.: WO2014/074154
PCT Pub. Date: May 15, 2014

(65) Prior Publication Data
US 2015/0261224 A1 Sep. 17, 2015

Related U.S. Application Data

(63) Continuation of application No. PCT/US2012/063818, filed on Nov. 7, 2012.

(51) Int. Cl.
*G05B 15/02* (2006.01)
*E21B 34/06* (2006.01)
(Continued)

(52) U.S. Cl.
CPC ............ *G05B 15/02* (2013.01); *E21B 34/066* (2013.01); *E21B 43/08* (2013.01); *E21B 43/12* (2013.01); *E21B 47/06* (2013.01); *E21B 47/065* (2013.01)

(58) Field of Classification Search
CPC .... E21B 2034/007; E21B 43/14; E21B 34/14; E21B 41/0085; E21B 43/12;
(Continued)

(56) References Cited

U.S. PATENT DOCUMENTS 3,294,171 A * 12/1966 Kelley ................ E21B 33/1295
166/120
5,603,386 A 2/1997 Webster
(Continued)

FOREIGN PATENT DOCUMENTS

WO  WO 02/36936  5/2002
WO  WO 2009/098512  8/2009
(Continued)

OTHER PUBLICATIONS

PCT International Search Report and Written Opinion of the International Searching Authority, PCT/US2013/036991, dated Aug. 14, 2013, 16 pages.

*Primary Examiner* — Kipp C Wallace
(74) *Attorney, Agent, or Firm* — Scott Richardson; Parker Justiss, P.C.

(57) ABSTRACT

A well screen assembly includes a valve configured to control flow between the interior and exterior of the well screen assembly, and in certain instances control flow through a flow control device (e.g., inflow control device and/or other). The valve can be operated in response to a signal detected by an in-well sensor.

23 Claims, 3 Drawing Sheets

(51) Int. Cl.
*E21B 43/08* (2006.01)
*E21B 47/06* (2012.01)
*E21B 43/12* (2006.01)

(58) Field of Classification Search
CPC .... E21B 47/0905; E21B 23/00; E21B 34/063; E21B 34/066
See application file for complete search history.

(56) References Cited

U.S. PATENT DOCUMENTS

| | | | |
|---|---|---|---|
| 7,322,410 B2 | 1/2008 | Vinegar et al. | |
| 7,918,272 B2 | 4/2011 | Gaudette et al. | |
| 8,322,426 B2 | 12/2012 | Wright et al. | |
| 8,839,871 B2 | 9/2014 | Wright et al. | |
| 2003/0111224 A1* | 6/2003 | Hailey, Jr. | E21B 34/06 166/278 |
| 2004/0016549 A1 | 1/2004 | Selinger et al. | |
| 2004/0020643 A1* | 2/2004 | Thomeer | E21B 47/01 166/250.01 |
| 2005/0207279 A1* | 9/2005 | Chemali | E21B 17/028 367/83 |
| 2009/0101329 A1* | 4/2009 | Clem | E21B 43/32 166/66.6 |
| 2009/0151925 A1 | 6/2009 | Richards et al. | |
| 2009/0223670 A1* | 9/2009 | Snider | E21B 23/00 166/308.1 |
| 2009/0288838 A1 | 11/2009 | Richards | |
| 2010/0200243 A1* | 8/2010 | Purkis | E21B 34/06 166/373 |
| 2011/0067886 A1 | 3/2011 | Moen | |
| 2011/0240311 A1 | 10/2011 | Robison et al. | |
| 2011/0265987 A1* | 11/2011 | Wright | E21B 34/063 166/154 |
| 2012/0006562 A1* | 1/2012 | Speer | E21B 23/04 166/373 |
| 2012/0037360 A1* | 2/2012 | Arizmendi, Jr. | E21B 23/04 166/250.01 |
| 2012/0090687 A1 | 4/2012 | Grigsby et al. | |
| 2012/0138311 A1* | 6/2012 | Stout | E21B 34/10 166/373 |
| 2013/0048290 A1 | 2/2013 | Howell et al. | |
| 2013/0264051 A1 | 10/2013 | Kyle et al. | |
| 2014/0076542 A1* | 3/2014 | Whitsitt | E21B 34/14 166/250.1 |

FOREIGN PATENT DOCUMENTS

| | | |
|---|---|---|
| WO | WO 2011/139520 | 11/2011 |
| WO | WO 2013/122560 | 8/2013 |
| WO | 2014074154 A1 | 5/2014 |
| WO | WO 2014/074093 | 5/2014 |

* cited by examiner

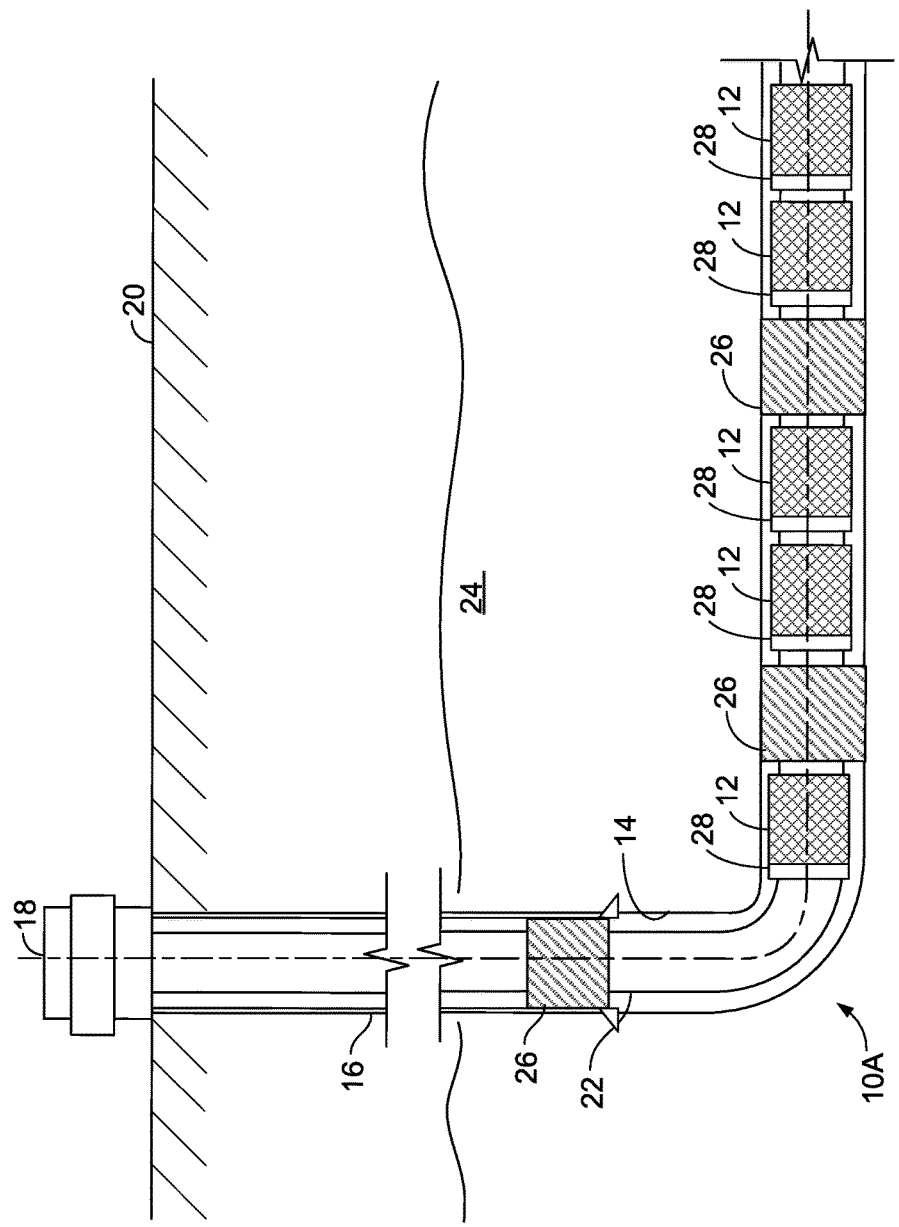

WELL FLUID EXCHANGE FLOW CONTROL

CROSS-REFERENCE TO RELATED APPLICATIONS

This Application is a 371 U.S. National Phase Application and claims the benefit of priority to International Application No. PCT/US2013/036991, filed on Apr. 17, 2013 and entitled "Well Fluid Exchange Flow Control", which claims the benefit of priority to International Application No. PCT/US2012/063818, filed on Nov. 7, 2012 and entitled "Time Delay Well Flow Control", the contents of which are hereby incorporated by reference.

BACKGROUND

In completing a well, drilling fluids, such as drilling mud and other fluids in the well during drilling, are circulated out of the well and replaced with a completion fluid. For example, the completion fluid is pumped down the bore of a production string to displace the drilling fluids up the annulus between the production string and wellbore wall, or vice versa. The completion fluids can take different forms, but are typically a solids-free liquid meant to maintain control over the well should downhole hardware fail, without damaging the subterranean formation or completion components. The fluid is typically selected to be chemically compatible with the formation, for example, having a specified pH.

As the well is brought onto production, fluids from the subterranean zone accessed by the well are produced to the terranean surface via the production string. In some instances, the well, for example long deviated wells, experiences a heel-toe effect where, due to frictional pressure losses, the fluid inflow rate varies along the length of the well with the highest inflow tending to be near the heel of the well. Such variations usually negatively affect the oil sweep efficiency and the ultimate recovery. Moreover, the heel-toe effect impacts well clean-up as the well is being brought onto production in that the filter cake is cleaned from the heel first, and the heel begins producing first limiting the pressure drop needed to properly clean filter cake from the toe.

DESCRIPTION OF DRAWINGS

FIGS. 1A and 1B are side partial cross-sectional views of example well systems. FIG. 1A shows an open hole completion with well screens and FIG. 1B shows a cased completion.

Like reference symbols in the various drawings indicate like elements.

DETAILED DESCRIPTION

Figure 1B:
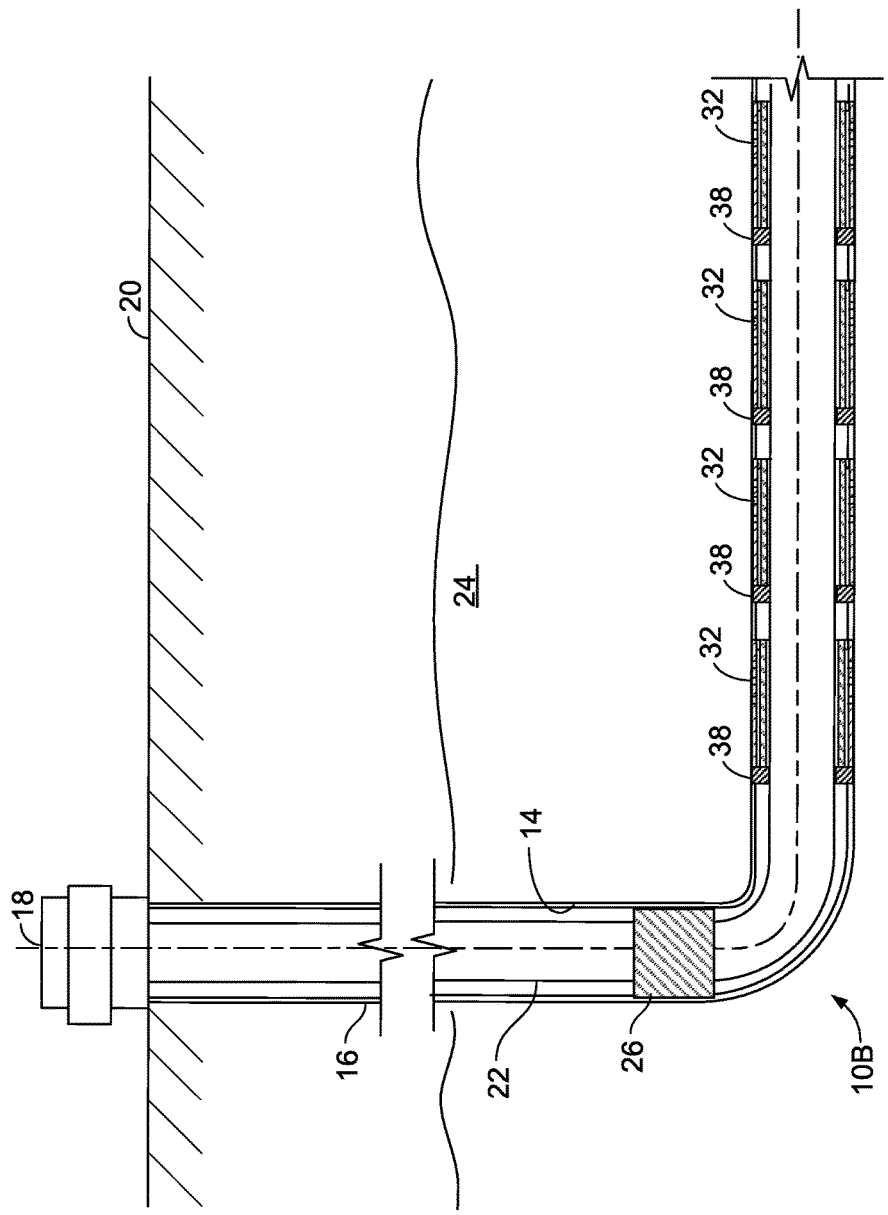

FIG. 1A shows an example well system 10A in an open hole completion configuration. The well system 10A is shown as a horizontal well, having a wellbore 14 that deviates to horizontal or substantially horizontal in a subterranean zone of interest 24. A type of production tubing, referred to as casing 16, is cemented in the wellbore 14 and coupled to a wellhead 18 at the surface 20. The casing 16 extends only through the vertical portion of the wellbore 14. The remainder of the wellbore 14 is completed open hole (i.e., without casing). A production tubing string 22 extends from wellhead 18, through the wellbore 14 and into the subterranean zone of interest 24. The production string 22 can take many forms, for example, as a continuous tubing string between the subterranean zone 24 and the wellhead 18, as a length of production liner coupled to the casing 16 at a liner hanger with a tieback liner extending from the liner hanger to the wellhead 18, and/or another configuration. A production packer 26 seals the annulus between the production string 22 and the casing 16. Additional packers 26 can be provided between the screen assemblies 12 to seal the annulus between the wellbore wall and the production string 22. The production string 22 operates in producing fluids (e.g., oil, gas, and/or other fluids) from the subterranean zone 24 to the surface 20. In certain instances, the production string 22 can also be used in injecting fluids (e.g., acid and/or other fluids) into wellbore 14 and into the subterranean zone 24. The production string 22 includes one or more well screen assemblies 12 (five shown). In some instances, the annulus between the production string 22 and the open hole portion of the wellbore 14 may be packed with gravel and/or sand. The well screen assemblies 12 and gravel/sand packing allow communication of fluids between the subterranean zone 24 and the interior of the production string 22. The gravel/sand packing provides a first stage of filtration against passage of particulate and larger fragments of the formation to the production string 22. The well screen assemblies 12 provide a second stage of filtration, and are configured to filter against passage of particulate of a specified size and larger into the interior center bore production string 22. One or more of the well screen assemblies 12 is provided with a flow control device 28 that controls flow through the well screen assembly 12, between the bore of the production string 22 and the subterranean zone 24.

FIG. 1B shows an example well system 10B in a cased completion configuration. In the well system 10B, the casing and/or a production liner (collectively casing 16) extends through the subterranean zone 24, and in certain instances, throughout the length of the wellbore 14. Like the production string 22 in the open hole context, the casing 16 operates as a production tubing in producing fluids from the subterranean zone 24 to the surface 20. The cased completion can take many forms, for example, as a continuous string of casing tubing between the subterranean zone 24 and the wellhead 18, as a length of liner coupled to a casing tubing at a liner hanger with a tieback liner extending from the liner hanger to the wellhead 18, and/or another configuration. The casing 16 is provided with openings 32 to allow communication of fluid between the subterranean zone 24 and the interior of the casing 16 and a flow control device 38 between the openings 32 and the interior of the casing 16 that controls that flow.

In both instances, prior to completing the well system 10A or 10B, it is subjected to a fluid exchange operation where drilling fluids, such as drilling mud and other fluids in the well during drilling, are circulated out of the well and replaced with a completion fluid. For example, the completion fluid is pumped down the bore of a production string to displace the drilling fluids up the annulus between the production string and wellbore wall, or vice versa. During the fluid exchange operation, the flow control devices 28, 38 are set to a closed state, sealing against passage of fluid between the interior and exterior of the production string 22 or casing 16. Sealing the flow control devices 28, 38 makes the production string 22 or casing 16 respond to the circulation operation effectively as a continuous (unapertured)

tubing. If the flow control devices 28, 38 were not sealed (i.e., open), the ability of the flow control devices 28, 38 to pass fluids could cause a short circuit of the circulation flow through the flow control devices 28, 38 and make it more difficult to effectively circulate the fluids from drilling out of the wellbore.

Thereafter, the well system 10A or 10B is brought onto production by opening the flow control devices 28, 38 to allow fluids from the subterranean zone 24 to flow into the interior of the production string 22 and be produced to the terranean surface 20. In certain instances, the opening of the flow control devices 28, 38 can be staged to cause flow to begin at or near the toe of the wellbore 14 (i.e., at or near the furthest extent of the wellbore 14) and progress in a controlled manner toward the heel of the wellbore 14 (i.e., near where the wellbore 14 deviates from vertical). For example, one or more flow control devices 28, 38 in an interval of the wellbore 14 at or near the toe can be opened first, then flow control devices 28, 38 in intervals progressively farther from the toe and nearer to the heel can be opened in stages until the entire well system 10A or 10B is open and producing. Filter cake (i.e., drilling mud caked to the wall of the wellbore 14) is cleaned from the wall of the wellbore 14 from the toe end first and then progressively back toward the heel end.

In certain instances, to facilitate cleaning filter cake, some of the flow control devices 28, 38 can be temporarily re-closed to focus flow from the subterranean zone 24 into specific intervals that, in turn, promotes cleaning of the filter cake in those specific, open intervals. While a number of different orders of opening and re-closing the flow control devices 28, 38 can be used, in one example, after an interval nearer the toe has been cleaned, its flow control devices 28, 38 can be closed and, concurrently or separately, the flow control devices 28, 38 of the next interval nearer the heel opened. The opening and closing can progress in this manner to the heel of the wellbore 14. Thereafter, all the flow control devices 28, 38 can be re-opened in the staged manner described above or in another order to fully bring the well system 10A or 10B onto production.

Figure 2:
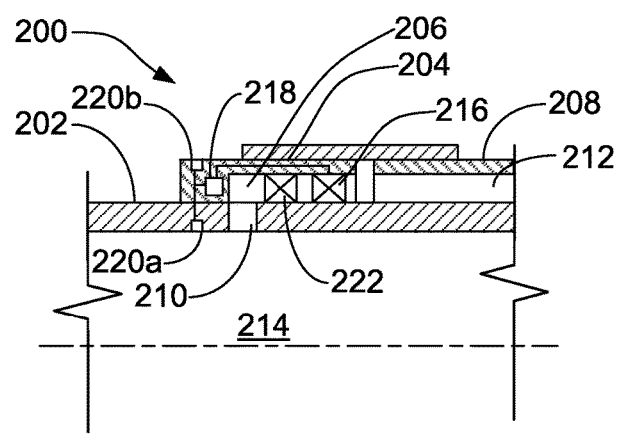
FIG. 2 is a detail half cross-sectional view of a production device having a time delay valve.

FIG. 2 shows a schematic configuration of an example flow control device 200 that can be used as flow control device 28, 38. In the context of flow control device 38, the casing adjacent the flow control device 38 includes an inner tubing 202 and an outer tubing 208 that defines an axial flow passage 212 in between. The axial flow passage 212 is in communication with the openings 32 in the casing. The outer tubing 208 is sealed at one end to the tubing 202 and sealed to the flow control device 200 at its other end. Therefore, flow between the outer tubing 208 and the center bore 214 of the tubing 202 (and thus casing) must flow through the flow control device 200. The flow control device 200 operates as a flow restriction of specified characteristics to control the flow between center bore 214 and the exterior of the casing and surrounding subterranean zone. In certain instances, one or more other flow control devices 200 can be positioned on the tubing 202, for example, spaced along the casing.

In the context of flow control device 28, the well screen assembly includes a base tubing 202 with a filtration screen assembly 208 positioned circumferentially about the tubing 202. The filtration assembly 208 is sealed at one end to the base tubing 202 and sealed to the flow control device 200 at its other end. Therefore, flow between the filtration assembly 208 and the center bore 214 of the base tubing 202 (and thus production string) must flow through the flow control device 200. The flow control device 200 operates as a flow restriction of specified characteristics to control the flow between center bore 214 and the exterior of the well screen assembly and surrounding wellbore annulus and subterranean zone. In certain instances, one or more other flow control devices 200 can be positioned on the base tubing 202, for example, at the opposing end of the screen assembly 208 and/or intermediate the ends of the screen assembly 208.

The filter assembly 208 is a filter that filters against passage of particulate of a specified size or larger. Filter assembly 208 can take a number of different forms and can have one or multiple layers. Some example layers include a preformed woven and/or nonwoven mesh, wire wrapped screen (e.g., a continuous helically wrapped wire), apertured tubing, and/or other types of layers. Filter assembly 208 defines an axial fluid passage 212 interior to the filter assembly 208 and/or between the filter assembly 208 and the base tubing 202. The axial fluid passage 212 communicates fluid axially along the length of the well screen assembly.

The flow control device 200 includes an annular housing 204 mounted on the tubing 202. The housing 204 defines an interior flow passage 206 that communicates between the internal center bore 214 of the tubing 202, via sidewall aperture 210 in the tubing 202, and the subterranean zone surrounding the well screen assembly, via the axial flow passage 212 of the filtration screen assembly 208. The flow control device 200 includes a flow restriction 222 in the flow passage 206 that can produce a specified fixed or variable flow restriction to flow through the flow passage 206. The flow restriction can be a partial restriction or can selectively seal the flow passage 206. The flow restriction 222 can take a number of forms, including fixed or variable orifices, manually operated valves (e.g., operated with a tubing conveyed and/or wire conveyed operating tool downhole or set at the surface by an operator), valves responsive to a surface or downhole signal (e.g., electric, hydraulic, acoustic, optical and/or other signal types), fluid responsive valves (e.g., responsive to fluid pressure, flow rate, viscosity, temperature and/or other fluid characteristics) including fluid diodes, and/or other types of flow restrictions. In certain instances, flow control device 200 can be a type of device referred to in the art as an inflow control device, and the flow restriction 222 can be the primary working components of such a device. A number of different inflow control device configurations can be used.

The flow control device 200 further includes a valve 216 in the passage 206 that is operable to change between sealing and allowing flow through the flow passage 206, and thus, change between sealing and allowing flow between the center bore 214 and the exterior of the tubing 202 (e.g., the subterranean zone). In certain instances, the valve 216 is communicably coupled to an electronic controller 218 of the flow control device 200. The controller 218 can include a battery and is configured to actuate (i.e., change) the valve between sealing and allowing flow.

Figure 3:
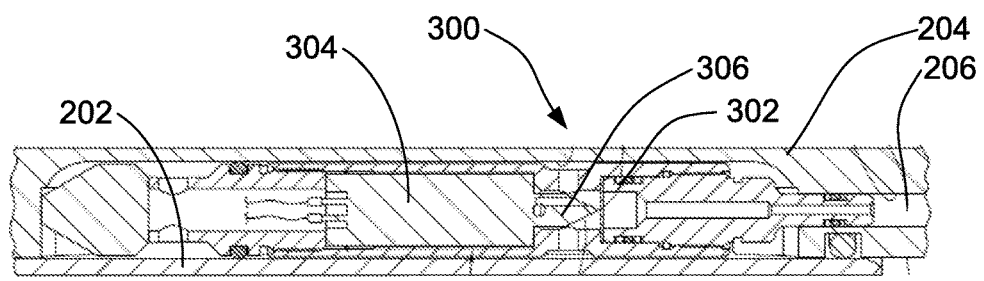
FIG. 3 is a detail cross-sectional view of one example valve.

The valve 216 can take a number of different forms. FIG. 3 shows one example of a valve 300 that can be used as valve 216. The valve 300 includes a pressure barrier 302 in the flow passage 206 that seals against passage of fluid through the flow control device. A linear actuator 304, communicably coupled to the controller 218, is positioned adjacent the pressure barrier 302 and includes a piercing tip 306. When actuated by the controller 218, the linear actuator 304 extends its piercing tip 306 into and rupturing the pressure barrier 302 to allow passage of fluid through the flow passage 206. The linear actuator 304 can be an electromagnetic actuator that moves the piercing tip 306 by the interaction of magnetic fields, by a pyrotechnic actuator that moves the piercing tip 306 via pressure from an ignited pyrotechnic, and/or another type of linear actuator. The barrier can be a ceramic, plastic, composite, or metallic thin plate and/or another configuration. Since the barrier is ruptured, once the valve 300 has been actuated, it cannot be resealed. In another example, the linear actuator 304 can be provided with a stopper, rather than a piercing tip, that can be inserted or withdrawn from the flow passage 206 multiple times to allow or seal against flow through the flow passage 206. In another example, the linear actuator 304 is replaced with a chemical actuator. The chemical actuator is communicably coupled to the controller 218 and is positioned proximate the pressure barrier 302. When activated by the controller 218, the chemical actuator sends a jet of fluid into and weakening the pressure barrier 302 to allow passage of fluid through the flow passage 206. The chemical actuator can send a heated jet of fluid such as from an exothermic oxidation-reduction reaction (thermite reaction). The chemical actuator can send a corrosive jet of fluid such as from an acid producing reaction. Yet other examples of valve 216 exist and can be used.

In certain instances, the controller 218 is provided with an electronic timing circuit that enables the controller 218 to actuate the valve 216 after one or more specified time delays. For example, the specified time delay(s) can be hard coded into the controller 218 and/or can be set by an operator remotely or while the flow control device 200 is at the terranean surface (out of the wellbore). In certain instances, the controller 218 is configured so that an operator can access the controller 218 to initiate counting the specified time delay remotely or while the controller 218 is at the terranean surface (out of the wellbore). Alternately or additionally, the controller 218 can be configured to initiate counting the specified time delay based on the controller 218 detecting specified stimuli. In certain instances, the stimuli can be an in-well event associated with a well fluid exchange circulating out fluids from drilling and prior operations and replacing those fluids with completion fluid. In certain instances, the controller 218 can be configured to actuate the valve 216 without the time delay based on the stimuli and, in such instances, can be provided without the timer.

In certain instances, the time delay can be selected based on the expected duration of time to complete a well fluid exchange, for example, to actuate the valve 216 after the fluids in the well from drilling and prior operations have been circulated out and replaced with completion fluids. In addition to the time to exchange the fluids, this time can account for additional time, such as time to assemble and run the production string into the wellbore (e.g., if counting the delay is initiated at the surface), time to arrange and hook up the equipment needed for the well fluid exchange operation, the scheduling and availability of the equipment and other resources needed for the well fluid exchange operation, and other operations that might be performed prior to or in connection with the well fluid exchange. In instances using multiple flow control devices 200 in the same string (e.g., a string having multiple well screen assemblies), the time delay can be different for different of the flow control devices 200. In certain instances, the time delay can be selected to, additionally or alternately, stage the opening of the flow control devices 200 or groups of flow control devices 200 (e.g., all flow control devices 200 in a group and/or interval can have the same delay) to cause flow to begin at or near the toe of the wellbore and progress in a controlled manner toward the heel of the wellbore. For example, different time delays can be selected so that one or more flow control devices 200 in an interval of the wellbore at or near the toe can be opened first, and then one or more flow control devices 200 in intervals progressively farther from the toe and nearer to the heel are opened in stages until the entire well system is open and producing. Additional time delays can be used to close and re-open the flow control devices 200, if desired. In certain instances, the time delays can be selected based on other basis. In certain instances, the time delays can be many minutes (e.g., when counting is initiated after the fluid exchange operation) or many hours (e.g., when counting is initiated during or prior to the fluid exchange operation) or many days (e.g., when counting is initiated while the controller 218 is at the surface).

In certain instances the flow control device 200 includes one or more sensors communicably coupled to the controller 218 for sensing the stimuli. FIG. 2 shows a sensor 220a configured to sense a characteristic in the center bore 214 and a sensor 220b configured to sense a characteristic in the annulus between the production string and the wellbore wall. In other instances, fewer (e.g. one or none) or more sensors could be used, and the sensors could be provided to sense stimuli in different locations. The controller 218 can be configured to trigger counting the specified time delay based on input from one or both sensors 220a, 220b and/or can be configured to actuate the valve 216 (without the time delay) based on input from one or both sensors 220a, 220b. Depending on the configuration of the valve 216, the valve can be opened or closed in response to the stimuli. In certain instances, multiple stimuli can open and close and operate the valve 216 multiple times. Notably, the controller 218 can be configured to operate independently and automatically to begin counting the specified time and/or to operate the valve 216 without a connection by a control line outside of the well.

In one example, one or both of the sensors 220a, 220b can be flow rate sensors and the controller 218 can look for a specified flow rate or pattern of flow rates. In certain instances, the controller 218 can look for a specified flow rate or pattern of flow rates resulting from the circulation of fluids from a fluid exchange and/or another event in the wellbore. In another example, one or both of the sensors 220a, 220b are fluid pressure sensors. In certain instances, the controller 218 can look for a specified pressure or pattern of pressures resulting from the circulation of fluids and/or another event in the wellbore. In certain instances, the controller 218 can look for a pressure pattern corresponding to running the well string into a subterranean formation. In certain instances, the controller 218 can look for pressure changes, including pressure changes based on fluid flow conditions in the wellbore. In another example, one or both of the sensors 220a, 220b are temperature sensors. In certain instances, the controller 218 can look for a specified temperature or pattern of temperatures resulting from the circulation of fluids (e.g., resulting from introduction of the initially cooler completion fluids that lower the temperature; the temperature will increase after the completion fluids are no longer circulated) and/or another event in the wellbore. In certain instances, the controller 218 can look for a temperature pattern corresponding to running the well string into the subterranean formation. In yet another example, one or both of the sensors 220a, 220b are pH sensors and the controller 218 can look for a specified pH or pattern of pH resulting the circulation of fluids (e.g., from the drilling fluids being replaced by completion fluids of a different pH) and/or another event in the wellbore. In yet another example, one or both of the sensors 220a, 220b can be acoustic sensors that listen for changes in flow, passage of tools used in the fluid exchange or other events associated with the fluid exchange operation. Examples of acoustic sensors include but are not limited to accelerometers, strain gauges, piezoelectric materials, magnetostrictive materials, and other ferroelectric materials. In yet another example, the controller 218 can be coupled to a strain sensor in or near the seal element of the production packer to determine when the production packer has been activated (e.g., typically done after the fluid exchange is complete). In yet another example, one or both of the sensors 220a, 220b can be magnetic sensors to sense passage of a magnetic (permanent and/or electromagnetic) ball, spheroid, dart, magnetic tag on a well tool and/or another magnetic device through the bore 214. The magnetic device can be dropped, pumped, carried by or pushed with a tubing string, pushed by a tractor and/or otherwise. Thus, an operator can send the magnetic device from the surface through the bore 214 at a chosen time to initiate the timers and/or actuate the controller 218 to actuate the valve 216. Other examples of sensors and stimuli exist. Notably, both sensors 220a, 220b need not be of the same type of sensor, and the controller 218 can be configured to look for specified characteristics in multiple domains (flow rate, pressure, temperature, pH, acoustic noise, and/or other domains) concurrently.

The controller 218 can be configured to determine the occurrence of an event associated with a well fluid exchange based on input from the sensors (e.g., sensors 220a or 220b) and, in turn, begin counting the specified time delay or actuate the valve 216 based on the determination that the fluid exchange has occurred. The event can be associated with the beginning, end or another event in the fluid exchange. Alternately or additionally, the controller 218 can be configured to determine occurrence of a signal introduced into the wellbore by an operator based on input from the sensors (e.g., sensors 220a, 220b) and, begin counting the specified time delay or actuate the valve 216 based on the determination that the signal from an operator has occurred. In certain instances, the controller 218 can be configured to respond differently to different stimuli. For example, the controller 218 can start the timer in response to certain stimuli or certain patterns of stimuli, open the valve 216 in response to certain stimuli or certain patterns of stimuli, and close the valve in response to certain stimuli or certain patterns of stimuli. In one example of a controller 218 responsive to magnetic stimuli, each time the controller senses passage of a magnetic device, the valve 216 changes state (i.e., opens or closes).

In certain instances, the flow control devices 200 can be staged without using a timer. For example, as flow begins at the toe of the wellbore in the center bore of the production string will decrease and increase the pressure differential across the upstream completion. If provided with pressure sensors as sensor 220a and/or 220b, the controller 218 can be configured to look for such pressure changes and open the flow control devices 200 progressively toward the heel of the well as the pressure differential moves upstream.

In certain instances, the actuator 304 can be powered by current generated downhole. For example, the sensor 220a, 220b can include a coil and/or another coil can be positioned in or near the flow control device 200 encircling its central bore. Passage of a magnetic device through the coil will generate a current, and that current can then used in initiating the actuator 304. In an example having a pyrotechnic actuator 304, the current can be used to ignite the pyrotechnic charge. In an example having a chemical actuator 304, the current can be used to release the jet of fluid that weakens the pressure barrier 302. Other examples exist. In certain instances, the controller 218 can be omitted and the actuator 304 (and thus valve 216) actuated based on the current generated by the magnetic device passing through the coil. Also, to increase the generated current, for example if the magnetic device is moving too slowly, a device to quickly move the magnetic device through the coil can be used. The device can be dropped, pumped, carried by or pushed with a tubing string, pushed by a tractor and/or otherwise. The device can include a mechanism to quickly move the magnetic device which can be in the form of a rotating or oscillating mechanism, a spring loaded mechanism and/or otherwise. In certain instances, a spring loaded mechanism could be activated by supplying a magnetic detent to load and release a spring that quickly moves the magnetic device through the coil at an appropriate time for maximum energy generation.

Thus, in operation, the flow control device 200 is provided into the wellbore in an initial closed state, sealing against flow between the bore 214 and the exterior of the production tubing. In configurations where the timer is initiated at the terranean surface, the operator accesses the controller 218 to begin counting the specified time delay. The flow control device 200 (and production tubing carrying it) is run into position in the wellbore, and the fluid exchange operation is begun. Completion fluid is pumped down the bore 214 to displace the drilling fluids up the annulus between the production tubing and wellbore wall, or vice versa. In the sealed state, the valve 216 makes the production tubing respond to the circulation operation effectively as a continuous (unapertured) tubing, preventing short circuits through the flow control device 200. In configurations where the timer is initiated by in-well stimuli, the controller 218 looks for the specified stimuli and in response to the stimuli, initiates the timer. At the expiration of the specified time delay, the controller 218 operates the valve 216 to open, allowing flow between the bore 214 and the exterior of the production tubing. In certain instances, the time delays are staged so that one or more flow control devices 200 in an interval of the wellbore at or near the toe are opened first, then flow control devices 200 in intervals progressively farther from the toe and nearer to the heel are opened in stages until the entire well system is open and producing. Filter cake is thus cleaned from the toe end first and then progressively back toward the heel end. In configurations where the controller 218 operates without a timer, the controller 218 operates the valve 216 to open in response to the stimuli. As above, the flow control devices 200 can be opened in a staged manner from the toe to the heel until the entire well system is open and producing. In certain instances, additional stimuli can close and later re-open the valve 216 and/or the controller 218 can close and later re-open the valve 216 based on additional time delays. For example, after an interval nearer the toe has been cleaned, its flow control devices 200 can be closed and, concurrently or separately, the flow control devices 200 of the next interval nearer the heel opened. The opening and closing can progress in this manner to the heel of the wellbore. Thereafter, all the flow control devices 200 can be re-opened in the staged manner described above or in another order to fully bring the well system onto production.

Notably, although discussed in connection with bringing a well system on to production, the flow control devices 200 can alternately or additionally used in an injection context. For example, the controller 218 can operate the flow control devices 200 (with or without using timers) to initiate an injection operation. The controllers 218 can be configured stage the injection operation, as described above, or operate concurrently.

Also of note, the concepts above can be applied in operating a bypass to the flow restriction of the flow control devices. In certain instances, a valve configured to bypass the flow restriction in a flow control device and/or to change to a different flow restriction can be operated to decrease or increase the restriction presented to flow between the internal center bore of the tubing and the subterranean zone surrounding the well screen assembly, via the filtration screen assembly. The valve can be operated in the manners described above, and with or without using a controller and sensors. Using a valve to bypass the flow restriction can enable greater flexibility in the flow control presented by the flow control devices.

A number of embodiments have been described. Nevertheless, it will be understood that various modifications may be made. Accordingly, other embodiments are within the scope of the following claims.

What is claimed is:

1. A well screen assembly, comprising:
   production tubing comprising a center bore;
   a filtration screen positioned around the production tubing;
   a valve carried by the production tubing, the valve including an actuator and a fluid barrier configured to control flow between the center bore and an interior of the filtration screen, wherein the fluid barrier seals against flow between the center bore of the production tubing and the interior of the filtration screen;
   a sensor; and
   an electronic controller carried by the production tubing and in communication with the valve and the sensor, the controller configured to determine occurrence of an event associated with a well fluid exchange based on information from the sensor and, in response, send a signal to the actuator to pierce the fluid barrier.

2. The well screen assembly of claim 1, comprising a flow restriction configured to produce a specified restriction to flow between the center bore and the interior of the filtration screen; and
   where the valve is configured to selectively seal against flow through the flow restriction.

3. The well screen assembly of claim 1, where the valve is configured to selectively seal against flow between the center bore and an interior of the filtration screen.

4. The well screen assembly of claim 1, where the event is passage of a device associated with the well fluid exchange through the center bore of the tubing.

5. The well screen assembly of claim 4, where the sensor is configured to sense passage of a device through the tubing based on the magnetic properties of the device.

6. The well screen assembly of claim 5, where, upon passage of a magnetic device by the sensor, the sensor generates current used in powering an actuator for the valve.

7. The well screen assembly of claim 1, where the sensor comprises at least one of a flow rate sensor, a pressure sensor, an acoustic sensor, a strain sensor, a pH sensor, or a temperature sensor.

8. The well screen assembly of claim 1, where the controller is configured to determine that a completion fluid is being provided into the well based on information from the sensor and, in response, operate the valve.

9. The well screen assembly of claim 1, where the controller is configured to determine that a well fluid exchange has concluded based on information from the sensor and, in response, operate the valve.

10. The well screen assembly of claim 1, where the controller is configured to begin counting a specified time based on information from the sensor and, after the specified time, operate the valve.

11. The well screen assembly of claim 1, where the actuator is a linear actuator.

12. The well screen assembly of claim 1, where the controller is configured to operate independently without a control signal from outside of the well.

13. A method, comprising:
    determining an occurrence of an event associated with a well fluid exchange in a well using an electronic controller and sensor associated with a well screen assembly surrounding production tubing in the well; and
    in response to the determining, sending a signal to an actuator of a valve to pierce a fluid barrier to change a flow between an interior and an exterior of the well screen assembly, wherein the fluid barrier seals against flow between a center bore of the production tubing and the interior of the well screen assembly.

14. The method of claim 13, where changing flow between an interior and an exterior of the well screen assembly comprises changing between sealing and allowing flow through a flow passage of an inflow control device.

15. The method of claim 13, where determining an occurrence of an event associated with a well fluid exchange comprises determining that a completion fluid is in the well.

16. The method of claim 13, where determining an occurrence of an event associated with a well fluid exchange comprises determining passage of a device associated with the well fluid exchange through a center bore of the well screen assembly.

17. The method of claim 13, where determining an occurrence of an event associated with a well fluid exchange comprises using one of a magnetic sensor, a flow rate sensor, a pressure sensor, an acoustic sensor, a strain sensor, a pH sensor, or temperature sensor.

18. The method of claim 13, where changing flow between an interior and an exterior of the well screen assembly comprises changing a plurality of well screen assemblies open to allow flow between an interior and an exterior of the well screen assemblies in a staged manner beginning at a well screen assembly near a toe of the well and progressing to a well screen assembly near a heel of the well.

19. The method of claim 18, comprising changing previously opened well screen assemblies to closed to focus flow from a subterranean zone to one or more open well screen assemblies.

20. A well system, comprising:
    a well screen assembly including a filtration screen surrounding production tubing in a wellbore;
    a valve in the wellbore and associated with the well screen assembly, the valve including a linear actuator and a fluid barrier to control flow between an interior and an exterior of the well screen assembly, wherein the fluid barrier seals against flow between a center bore of the production tubing and the interior of the well screen assembly; and
    an electronic controller and sensor in the wellbore and associated the well screen assembly, the controller configured to determine occurrence of an event associated with a well fluid exchange based on information from the sensor and, in response, send a signal to the linear actuator to pierce the fluid barrier.

21. The well system of claim 20, where the event comprises circulating completion fluid into the well.

22. The well system of claim 20, where the event comprises circulating completion fluid into the well; and
   where the controller is configured to wait a specified time period after determining occurrence of the event and then operate the valve.

23. The well system of claim 22, comprising a plurality of well screen assemblies in the wellbore; and
   where the specified time period comprises a plurality of different specified time periods that stage the operating of valves of the plurality well screen assemblies to open a well screen assembly near a toe of the well system first, then progressively open well screen assemblies toward a heel of the well until the entire well system is open and producing.

* * * * *